Nov. 24, 1931.  C. C. FARMER  1,832,860
FLUID PRESSURE BRAKE
Filed Oct. 24, 1930  2 Sheets-Sheet 1
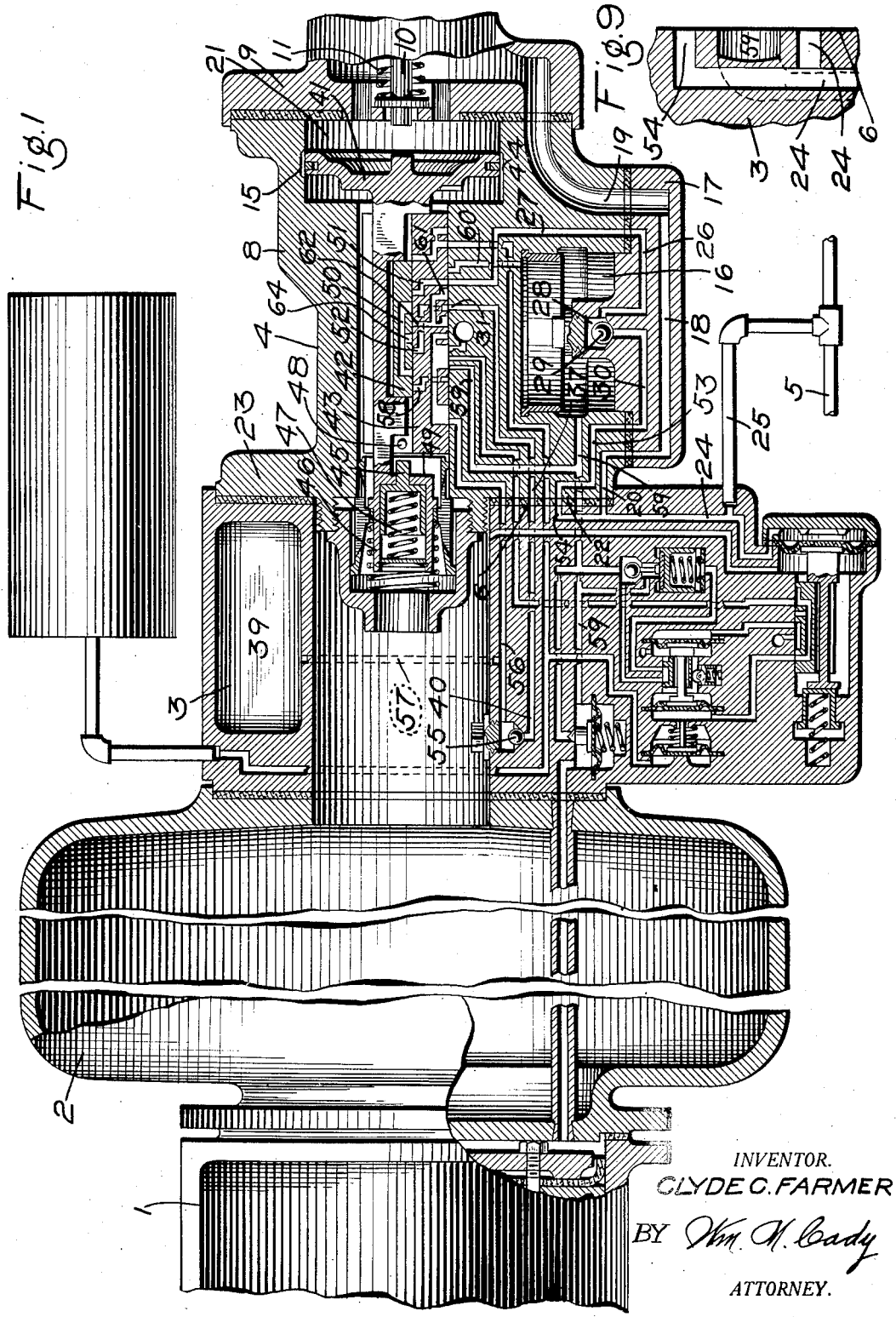
INVENTOR.
CLYDE C. FARMER
BY Wm. H. Cady
ATTORNEY.

Nov. 24, 1931.            C. C. FARMER            1,832,860
                       FLUID PRESSURE BRAKE
              Filed Oct. 24, 1930     2 Sheets-Sheet 2
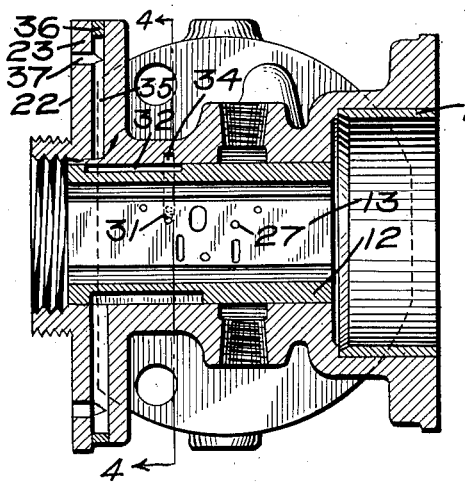
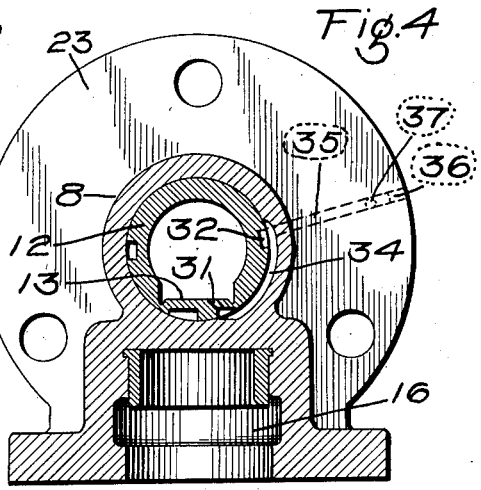
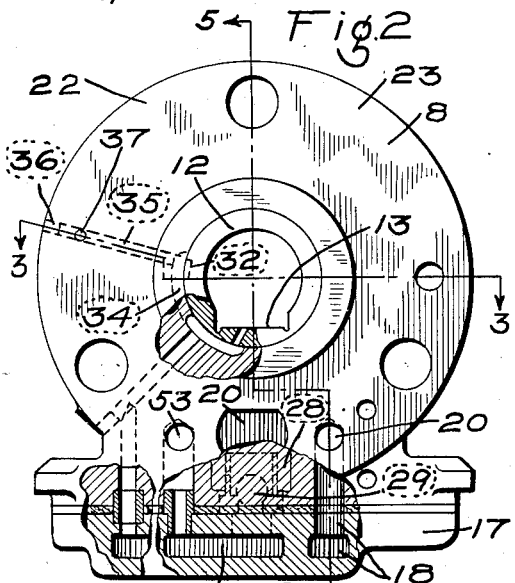
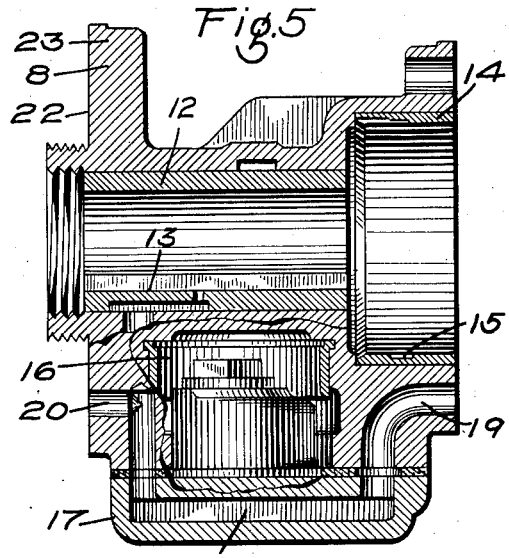
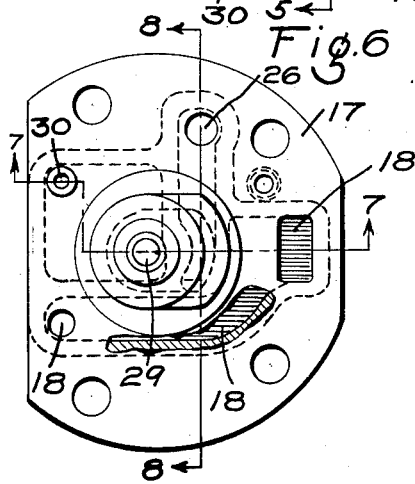
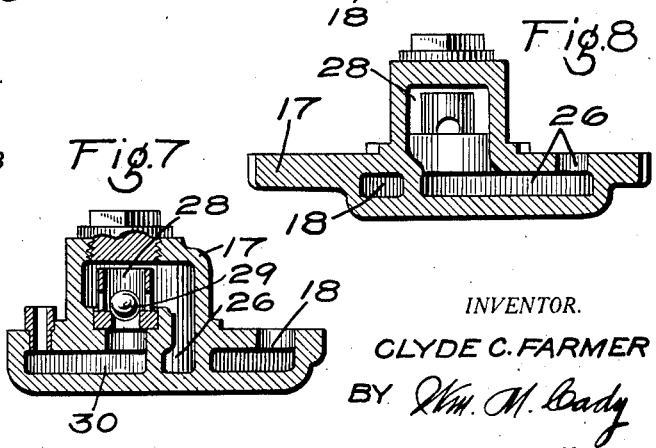
INVENTOR.
CLYDE C. FARMER
BY Wm. M. Cady
ATTORNEY.

Patented Nov. 24, 1931

1,832,860

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 24, 1930. Serial No. 490,872.

This invention relates to fluid pressure brakes, and more particularly to an automatic fluid pressure brake system in which the brakes are applied by reducing the brake pipe pressure and are released when the brake pipe pressure is increased.

On long trains, there is danger of causing excessive and damaging shocks when the brakes are applied, due to the fact that the brakes are applied on the cars at the head end of the train before they are applied on the cars at the rear end of the train, so that the slack is permitted to run in harshly and thus cause shocks.

To prevent these damaging shocks from occurring, I propose to employ fluid pressure brake equipment of the same general type as that shown and described in my pending application for United States Letters Patent filed July 28, 1930, and serially numbered 471,161, and my pending application filed October 18, 1930, and serially numbered 489,560, which type of equipment embodies means for delaying the brake application on the cars at the front end of the train, so that the brakes will apply at the head end of the train more nearly in synchronism with the application of the brakes at the rear end of the train; means for preventing the retardation of the brake application on the front end of the train on trains running at high speed, since in such cases, the slack will not run in so as to cause damaging shocks when the brakes are applied; means for preventing the retardation of the brake application on the cars at the front end of the train when the train is operating on a descending grade, after the brake cylinder pressure retainers become effective; and further embodying means for retarding the rate of build up of brake cylinder pressure on the cars at the head end of the train.

In both of the two above identified applications, the triple valve devices embodied in the fluid pressure brake equipments are especially designed for these equipments.

If it should be desired to substitute my proposed type of fluid pressure brake equipment for the equipment now in use on many thousands of cars, the triple valve devices embodied in these old equipments, although they may be in good working order, would have to be discarded or scrapped as a whole, if it were not possible to salvage some of the parts of these old triple valve devices. If each of these old triple valve devices were discarded or scrapped as a whole and a triple valve device of the new type substituted therefor, the owner would have to sustain a considerable loss in money, which is of course objectionable, especially when the new equipment is to be substituted in large numbers.

The principal object of my invention is to adapt the valve body or casing and the bushings of an ordinary triple valve device for use in connection with a type of fluid pressure brake equipment disclosed in each of the two above identified applications and thus reduce the owner's loss to a minimum.

According to my invention, I provide the salvaged slide valve bushing and casing of the old triple valve device with ports, grooves and passages which lead to the exterior of the casing when they are adapted to register with corresponding passages in the new equipment. Further, I secure a cap member to the casing which closes the open end of the emergency piston chamber and assists in defining a communication open to the brake cylinder. This cap member has a quick service passage and a brake pipe passage, and for preventing back flow of fluid through the quick service passage to the brake pipe is provided with a check valve.

Other objects and advantages will appear in the following more detailed description of my invention.

In the drawings; Fig. 1 is a diagrammatic view, mainly in section, of a fluid pressure brake equipment having certain parts of an ordinary triple valve device embodied therein; Fig. 2 is an end elevational view of a triple valve casing and slide valve bushing modified in accordance with the invention, and showing the cap member mounted on the casing, portions of the casing, bushing and cap member being broken away to more clearly illustrate the invention; Fig. 3 is a horizontal sectional view of the same taken on the line 3—3 of Fig. 2; Fig. 4 is a cross sectional view of the same taken on the line 4—4 of Fig. 3, the cap member being omitted; Fig. 5 is a vertical sectional view of the same taken on the line 5—5 of Fig. 2, portions being broken away to more clearly illustrate the cap member; Fig. 6 is a plan view of the cap member, a cap nut being omitted to more clearly illustrate the interior of this member; Figs. 7 and 8 are sectional views of the same taken on the lines 7—7 and 8—8 respectively of Fig. 6, the cap nut being shown; and Fig. 9 is a sectional view of a portion of a bracket member.

As shown in the drawings, the fluid pressure brake equipment may comprise a brake cylinder 1, an auxiliary reservoir 2, a bracket 3, a triple valve device 4, and a brake pipe 5. In the present embodiment of the invention, the brake cylinder and auxiliary reservoir are secured together. the bracket 3 is secured to auxiliary reservoir and the triple valve device 4 is secured to the bracket 3.

With the exception of the triple valve device and the quick service means, both of which will hereinafter be fully described, the fluid pressure equipment illustrated is substantially the same as that disclosed in my pending application filed October 18, 1930, and serially numbered 489,560. The several devices of this equipment are carried by, or otherwise associated with the bracket 3, and numerous passages in this bracket which lead to and from these devices are open to a face 6 of the bracket.

The triple valve device 4 comprises a salvaged casing having a body portion 8 and a cap portion 9 which is secured to the body portion 8, said cap portion having mounted therein a salvaged graduating stem 10 and graduating spring 11.

The triple valve device also comprises a salvaged slide valve bushing 12 having a slide valve seat 13 and further comprises a salvaged piston bushing 14 having an additional feed groove 15 formed therein, the purpose of which is described in my pending application filed September 11, 1930, and serially numbered 481,240.

In adapting an old triple valve, such as the K type, for use in connection with the equipment associated with the bracket 3, the quick action portion is removed, leaving the chamber 16, which contained the quick action valve mechanism, open at one end. This open end of the chamber 16 is closed by a cap 17 which is secured to the body portion of the casing.

The cap 17 has a brake pipe passage 18 formed therein which, when the cap is secured to the casing as just described, connects brake pipe passages 19 and 20 already in the casing, the passage 19 leading to the triple valve piston chamber 21 and the passage 20 leading to the face 22 of a flange 23 of body portion 8 of the casing, which flange is secured to the bracket member 3. With the body portion 8 of the casing thus secured to the bracket, the passage 20 registers with a brake pipe passage 24 in the bracket to which passage 24 the brake pipe 5 is connected through a branch pipe 25 as shown in Fig. 1. This cap also has a quick service passage 26 which, at one end, registers with the old quick service passage 27 in the casing and at its other end is open to a valve chamber 28 containing a ball check valve 29. Leading from the underside of the ball check valve 29 is a passage 30 which registers with a passage 53 in the casing which is adapted to register with a branch 54 of the brake pipe passage 24 in the bracket 3.

In adapting the salvage parts of an old triple valve device for use with my proposed equipment, a number of new communications must be established through the casing, and since that portion of the casing which surrounds the bushing 12 is annular in cross section and is comparatively thin, it is practically impossible to provide suitable communication passages in the casing. According to my invention, the bushing 12 is provided with exterior grooves which lead to the slide valve seat 13 through drilled ports. The casing is also provided with grooves interiorly. When the bushing is inserted in the casing, the casing and bushing cooperate, due to these grooves, to form fluid conducting passages which are open to the face of the flange 23 through ports and passages drilled in said flange.

Since all of the new passages in the triple valve device will be formed in substantially the same manner, I will limit the detailed description to the formation of one of such passages only, namely, the new portion of the quick service passage.

In preparing the casing and bushing 12 to form a passage, the casing is removed from the casing section 8, after which a port 31 is drilled from the exterior thereof to the slide valve seat 13 and a longitudinally extending groove 32 is formed in the exterior surface of the bushing. While the bushing is thus removed, the interior of the casing is provided with a curved groove 34 which is open to one end of a passage 35 drilled through the flange 23 of the casing in a direction parallel to the face 22 thereof. The outer end of this passage is closed by a plug 36 and inwardly of this plug leads to the face 22 through a port 37 which is drilled in the flange at right angles to the passage. Now when the bushing 12 is again properly mounted in the casing, the groove 34 connects the port 31 with one end of the groove 32 in the bushing, the other end of this groove 32 being open to the passage 35.

When the casing is secured to the bracket 3, the port 37 in the flange 23 of the casing registers with a passage which is connected to a quick service chamber 39 in the bracket 3 by way of a passage 40, past a ball check valve 55, and passages 56 and 57.

After the bushing 12 has been replaced, a new piston 41 is mounted in the piston chamber 21, which piston is adapted to operate new graduating and main slide valves 42 and 43 respectively, said slide valves having the necessary ports and cavities for controlling the operation of the remainder of the equipment.

With the triple valve device thus changed over for operation in connection with the proposed equipment, and a reduction in brake pipe pressure is made to effect an application of the brakes, the piston 41 moves so as to close the feed groove 15 and the usual feed groove 44 and prevent back flow of fluid from the auxiliary reservoir to the brake pipe.

The piston 41 as it thus moves, shifts the graduating slide valve 42 relatively to the main slide valve 43 until a projection 45 on a member 46 which is subject to the pressure of a spring 47 engages a pin 48 secured to the main slide valve 43. Further movement of the piston toward the right hand, is then resisted by the pressure of the spring 47, but when the brake pipe pressure is reduced a predetermined but light amount, for example, a reduction of one pound, the spring 47 is such that its resistance is overcome, permitting the piston to shift the graduating slide valve 42 to the initial quick service position in which a projection 49 on the piston stem engages the rear end of the main slide valve 43 without shifting said main slide valve.

In this position, a cavity 50 in the graduating slide valve 42 connects a port 51 in the main slide valve, which is in registration with the passage 27, to a port 52 in the main slide valve which is in registration with the new drilled port 31, thus connecting the brake pipe to the quick service chamber 39. As a consequence, a local reduction in brake pipe pressure is locally effected, following which the triple valve piston and slide valves are positively moved to service application position, in which position the service port 58 registers with the brake cylinder passage 59 so that fluid under pressure now flows from the auxiliary reservoir 2 to the brake cylinder 1.

With the main slide valve in service position, the port 51 in said valve registers with a passage 60 leading to the chamber 16 and a cavity 61 registers with the passage 27. A port 62 which is lapped by the graduating valve is open to the cavity 61.

When the auxiliary reservoir pressure has been reduced by flow to the brake cylinder to a degree slightly less than the reduced brake pipe pressure, the piston 41 shifts the graduating slide valve 42 back to service lap position, in which position, the supply of fluid to the brake cylinder is cut off.

Upon a further reduction in brake pipe pressure to increase the brake cylinder pressure, the piston 41 moves from lap toward full service position, shifting the graduating slide valve 42 relative to the main slide valve 43, which slide valve 43 is still in service position. As the slide valve 42 is thus shifted, it uncovers the service port 58 in the main slide valve, and since this port is in registration with the passage 59, fluid under pressure is supplied from the auxiliary reservoir to the brake cylinder. Further, as the graduating valve is thus shifted, the cavity 50 therein registers with the port 51 in the main slide valve and a port 64 in the graduating slide valve, which is open to the cavity 50, registers with the port 62 in the main slide valve, so that fluid under pressure is now vented from the brake pipe to the brake cylinder by way of pipe 25, passage 24, and branch passage 25 in the bracket 3, passage 53 in the casing, passage 30 in the cap 17, past the ball check valve 29, through chamber 28 and passage 26 in the cap 17, passage 27, cavity 61, port 62 in the main slide valve, port 64 and cavity 50 in the graduating slide valve, port 51 in the main slide valve, passage 60, chamber 16 and passage 59 leading to the brake cylinder, so that fluid under pressure is vented from the brake pipe to the brake cylinder to produce a local reduction in brake pipe pressure.

When the several parts of the triple valve device are thus in reapplication position, the reduction in auxiliary reservoir pressure, due to the flow of fluid from this reservoir to the brake cylinder may be such that the triple valve piston, in its traverse toward full service position, will not be moved to full service position, but will be brought to a stop in the reapplication position above described. When this is the case, the connection between the brake pipe and the brake cylinder is maintained. Now, if the brake pipe pressure should be reduced below brake cylinder pressure, by leakage of fluid from the brake pipe or by an over reduction in brake pipe pressure, and the triple valve parts do not move promptly to full service position, the ball check valve 29 will prevent back flow of fluid from the brake cylinder to the brake pipe.

From the foregoing description, it will be noted that in accordance with my invention, several of the major portions of an old triple valve device may be salvaged and adapted for use in connection with my proposed equipment.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a passage leading from said chamber and open to said brake cylinder, another passage open to said chamber, said passages and chamber providing a quick service communication through which fluid is adapted to be vented from the brake pipe to the brake cylinder, and means mounted in said casing operative to establish communication between the brake pipe and last mentioned passage.

2. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a passage leading from said chamber and open to said brake cylinder, another passage open to said chamber, said passages and chamber providing a quick service communication through which fluid is adapted to be vented from the brake pipe to the brake cylinder, and a plurality of slide valves mounted in said casing and operative to establish communication between the brake pipe and last mentioned passage.

3. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a passage leading from said chamber and open to said brake cylinder, another passage open to said chamber, said passages and chamber providing a quick service communication through which fluid is adapted to be vented from the brake pipe to the brake cylinder, a plurality of slide valves mounted in said casing and operative to establish communication between the brake pipe and the brake cylinder, and a piston subject to variations in fluid pressure on the opposite sides of the piston for controlling the operation of said slide valves.

4. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a passage leading from said chamber and open to said brake cylinder, another passage open to said chamber, said passages and chamber providing a quick service communication through which fluid is adapted to be vented from the brake pipe to the brake cylinder, means operative to establish communication between the brake pipe and last mentioned passage, and means carried by said cap for preventing back flow of fluid from the brake cylinder to the brake pipe.

5. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a passage leading from said chamber and open to said brake cylinder, another passage open to said chamber, said passages and chamber providing a quick service communication through which fluid is adapted to be vented from the brake pipe to the brake cylinder, means operative to establish communication between the brake pipe and last mentioned passage, and a ball check valve mounted in said cap for preventing back flow of fluid from the brake cylinder to the brake pipe.

6. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a quick service passage in said casing leading from the brake pipe, another quick service passage in the casing, a passage in said cap connecting said quick service passages, a normally vented chamber, and means operative to connect the last mentioned quick service passage to said chamber to locally vent fluid under pressure from the brake pipe in initiating an application of the brakes.

7. In a fluid pressure brake equipment, the combination with a brake pipe and a brake cylinder, of a triple valve device comprising a salvaged casing having a chamber from which a quick action mechanism has been removed and which is open at one end, a cap secured to said casing and closing the open end of said chamber, a quick service passage in said casing leading from the brake pipe, another quick service passage in the casing, a passage in said cap connecting said quick service passages, a normally vented chamber, means operative to connect the last mentioned quick service passage to said chamber to locally vent fluid under pressure from the brake pipe in initiating an application of the brakes, a piston subject on one side to variations in brake pipe pressure for controlling the operation of said means, and a passage in said cap through which the pressure of fluid acting on one side of said piston is varied.

8. In a fluid pressure brake equipment, the combination with a brake pipe and a brake cylinder, of a triple valve device comprising a casing having an open ended emergency piston chamber, a cap secured to said casing and closing the open end of said chamber, a passage leading from said chamber and open to said brake cylinder, another passage open to said chamber, both of said passages and chamber providing a quick service communication through which fluid is adapted to be vented from the brake pipe to the brake cylinder, and means mounted in said casing operative to establish communication between the brake pipe and last mentioned passage.

9. In a fluid pressure brake, the combination with a brake pipe, of a triple valve device comprising a casing having an open ended emergency piston chamber and a passage through which fluid is vented to cause quick service action, and a cap closing the open end of said chamber and having a passage connecting the brake pipe with said quick service passage.

10. In a fluid pressure brake, the combination with a brake pipe, of a triple valve device comprising a casing having an open ended emergency piston chamber and a passage through which fluid is vented to cause quick service action, a filling piece secured to said casing and having a passage connected to the brake pipe, and a cap closing the open end of said chamber and having a passage connecting the brake pipe passage in the filling piece with said quick service passage.

11. In a fluid pressure brake, the combination with a brake pipe, of a triple valve device comprising a casing having a triple valve piston chamber and an open ended emergency piston chamber and also having a quick service passage through which fluid is vented to cause quick service action, and a cap closing the open end of said chamber and having one passage connecting the brake pipe with said quick service passage and having another passage connecting the brake pipe with the triple valve piston chamber.

12. In a triple valve device, the combination with a casing therefor, of a securing flange on said casing, a slide valve bushing mounted in said casing and having a slide valve seat, a port leading from said seat to the exterior of said bushing, an exterior groove in said bushing and extending longitudinally thereof, a groove in said casing connecting said port and one end of the groove in the bushing, and a passage in said flange extending substantially parallel with a face of the flange, and a port open to said face and said passage, said casing and bushing cooperating in such a manner that said ports, grooves and passage form a communication through which fluid is adapted to flow.

13. The method of forming a new fluid conducting passage in a salvaged triple valve casing and slide valve bushing which consists in first removing the bushing from the casing, then forming a groove interiorly of the casing, drilling a passage in a securing flange of the casing substantially parallel to the face of the flange, plugging the outer end of said passage, drilling a port through the face of said flange to connect with said passage, drilling a port in said bushing, forming a groove in the exterior surface of the bushing and finally inserting the bushing in the casing so that the port in the bushing registers with one end of the groove in the casing and the groove in the casing connects the other end of the groove in the casing and the passage in said securing flange.

In testimony whereof I have hereunto set my hand, this 22nd day of October, 1930.

CLYDE C. FARMER.